Dec. 12, 1950  L. P. CRONVALL ET AL  2,533,225
REGULATED RECTIFIER
Filed Dec. 6, 1944
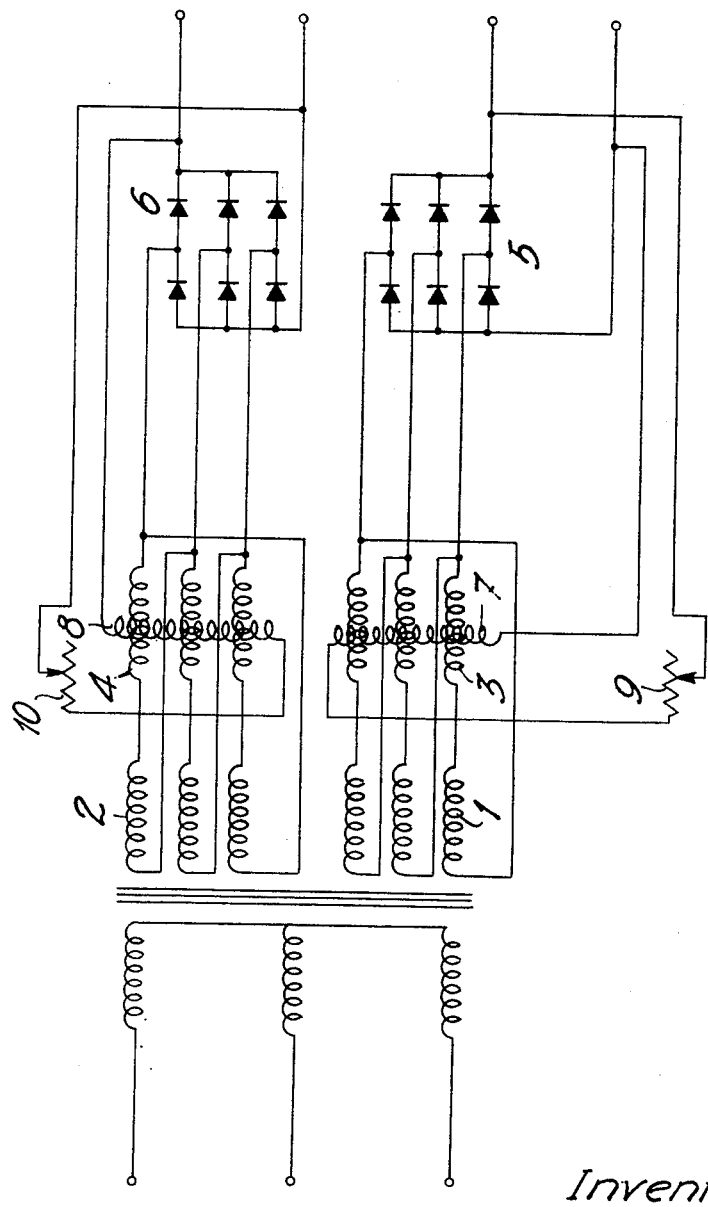
Inventors
Lars Per Cronvall
Gunnar Winckler Patented Dec. 12, 1950

2,533,225

UNITED STATES PATENT OFFICE 2,533,225

REGULATED RECTIFIER

Lars Per Cronvall, Stockholm, and Gunnar Winkler, Appelviken, Stockholm, Sweden, assignors to International Standard Electric Corporation, New York, N. Y.

Application December 6, 1944, Serial No. 566,889
In Sweden April 5, 1944

3 Claims. (Cl. 321—25)

This invention relates to reactors with or without D. C. excitation of the type frequently used in controlling voltage or current applied to an electrical device adapted to be supplied with three-phase alternating current, such as an electrical valve.

The main object of the invention is to provide a simplified circuit arrangement for such reactors capable of securing a wave form of the output voltage or current which is substantially free from harmonics.

Another object of the invention is to secure such freedom from harmonics without the aid of filter devices.

According to the invention, the delta connected secondaries of a three-phase transformer has the A.-C. windings of a saturable reactor serially connected therewith, one winding being connected in each phase thereof, and the three-phase output is fed through an electrical valve to produce a six-pulse unidirectional current output. This unidirectional current is then re-applied to an exciting winding of the reactor thereby substantially eliminating any tendency to produce an output having a harmonic.

A better understanding of the invention and of its objects and features may be attained by reading the following detailed description in conjunction with the accompanying drawings wherein:

On the drawing:

The figure is a circuit diagram of a preferred embodiment of our invention.

In said figure the invention is shown as applied to two constant current regulated rectifiers supplied with three-phase current over a common transformer having two separate sets of secondary windings 1 and 2 each winding being serially connected to the A.-C. windings of individual D. C. excited reactors 3 and 4 respectively whereby the A.-C. windings of each reactor together with its associated secondary transformer winding forms a 3 phase delta connection. Connected across the terminals of each of these phases are current valves 5 and 6 respectively. Each of these current valves comprises three sets of tandem-connected rectifiers, the output of which is taken from the parallel connection terminals of each rectifier set. The midpoint of each rectifier set is connected by three conductors to the three-phase secondaries of the transformers. Exciting windings 7 and 8 associated with the reactors 3 and 4 are fed from the D. C. sides of the current valves over adjustable resistances 9 and 10. Obviously in the circuit arrangement shown the direct current from each current valve will be a pure six pulse current. Such current may be used for any desired purpose, such as for supplying arc lamps to secure a noiseless burning thereof due to the absence of harmonics.

The invention is particularly applicable where D. C. excited reactors are operated so as to be highly saturated during a part of the cycle and in such case, it provides the means for overcoming the pronounced tendency to produce harmonics.

What we claim is:

1. A simplified circuit arrangement for securing a unidirectional current output substantially free of harmonics comprising a source of three phase power, a transformer having primary and three-phase delta connected secondaries, a reactor having A.-C. windings, each of said windings being serially connected between respectively different ones of said secondaries, and a D.-C. winding operatively associated with said A.-C. windings, electrical valves connected to the legs of said secondaries to produce a unidirectional current output, and a circuit for connecting said D.-C. winding across the output of said valves.

2. An arrangement in accordance with claim 1 wherein said valve further comprises three parallel sets of tandem connected rectifiers.

3. An arrangement in accordance with claim 1 wherein said connecting circuit further comprises a variable resistor for adjusting the D.-C. excitation of said reactor.

LARS PER CRONVALL.
GUNNAR WINKLER.

REFERENCES CITED

The following references are of record in the file of this patent:

UNITED STATES PATENTS

| Number | Name | Date |
|---|---|---|
| 1,822,618 | Gebhard | Sept. 8, 1931 |
| 2,012,588 | Logan | Aug. 27, 1935 |
| 2,164,912 | Giroz | July 4, 1939 |
| 2,212,229 | Giroz | Aug. 20, 1940 |
| 2,229,950 | Werner | Jan. 28, 1941 |
| 2,357,995 | Blomberg | Sept. 12, 1944 |

FOREIGN PATENTS

| Number | Country | Date |
|---|---|---|
| 423,618 | Great Britain | Feb. 5, 1935 |
| 512,788 | Great Britain | Sept. 26, 1939 |